US006614128B2

(12) United States Patent
Mizuguchi et al.

(10) Patent No.: US 6,614,128 B2
(45) Date of Patent: Sep. 2, 2003

(54) ON-VEHICLE WIRING HARNESS AND WEIGHT REDUCTION METHOD OF THE SAME

(75) Inventors: Yasushi Mizuguchi, Shizuoka (JP); Kazushige Shimura, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 182 days.

(21) Appl. No.: 09/778,914

(22) Filed: Feb. 8, 2001

(65) Prior Publication Data

US 2001/0013725 A1 Aug. 16, 2001

(30) Foreign Application Priority Data

Feb. 14, 2000 (JP) ........................................ 2000-035238

(51) Int. Cl.$^7$ ................................................. B60L 1/00
(52) U.S. Cl. ........................ 307/10.1; 307/9.1; 307/10.6
(58) Field of Search ................................. 307/9.1, 10.1, 307/10.6, 48

(56) References Cited

U.S. PATENT DOCUMENTS 4,477,792 A * 10/1984 Putman et al. ............... 336/180
6,459,170 B1 * 10/2002 Tamai et al. .................. 307/48

* cited by examiner

*Primary Examiner*—Brian Sircus
*Assistant Examiner*—Robert L DeBeradinis
(74) *Attorney, Agent, or Firm*—Armstrong, Westerman & Hattori, LLP

(57) ABSTRACT

The wiring harness includes a first electrical cable having a diameter corresponding to a first current rating of a low voltage load and a second electrical cable having a diameter corresponding to a second current rating of a high voltage load. The diameters of the first and second electrical cables are unified to have the same diameter. The second current rating is determined to be smaller than the first current rating, and the cables are unified to the first electrical cable for the low voltage load.

4 Claims, 4 Drawing Sheets

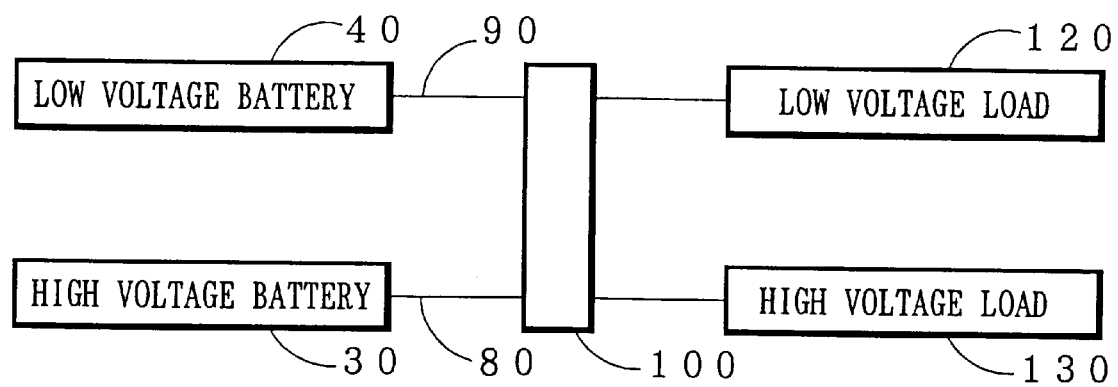
FIG. 1

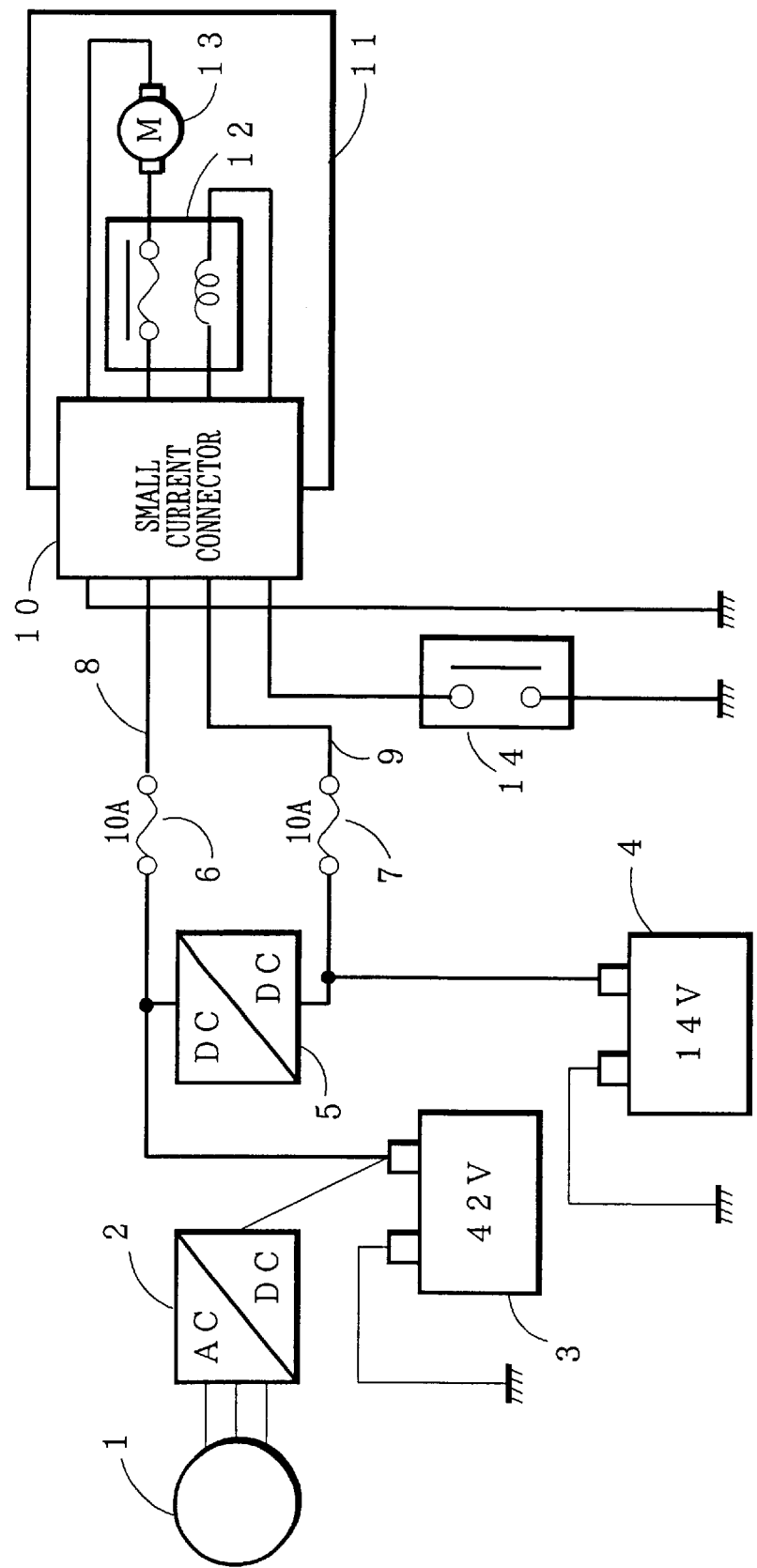
FIG. 2

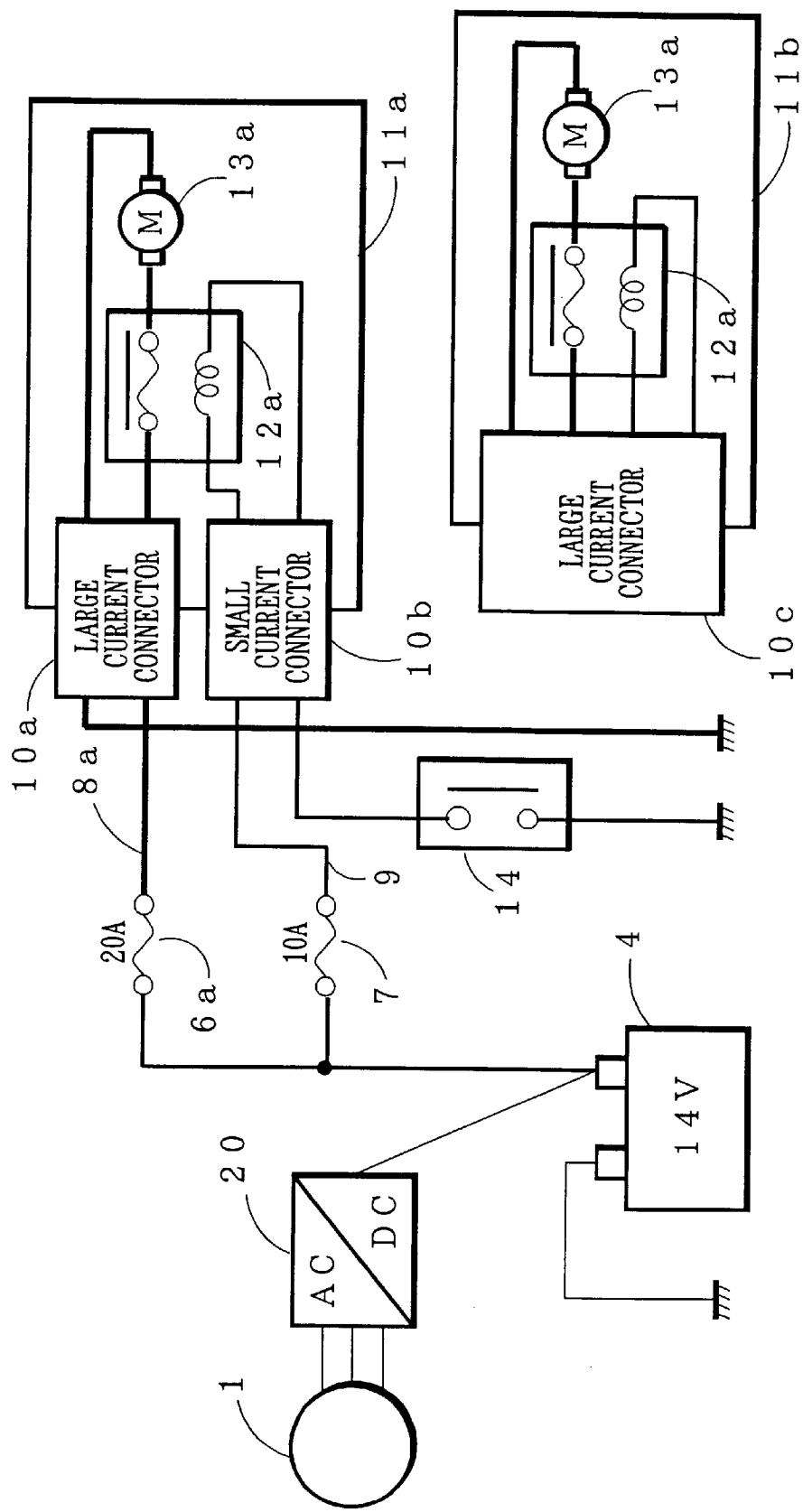
PRIOR ART
FIG. 3A
PRIOR ART
FIG. 3B

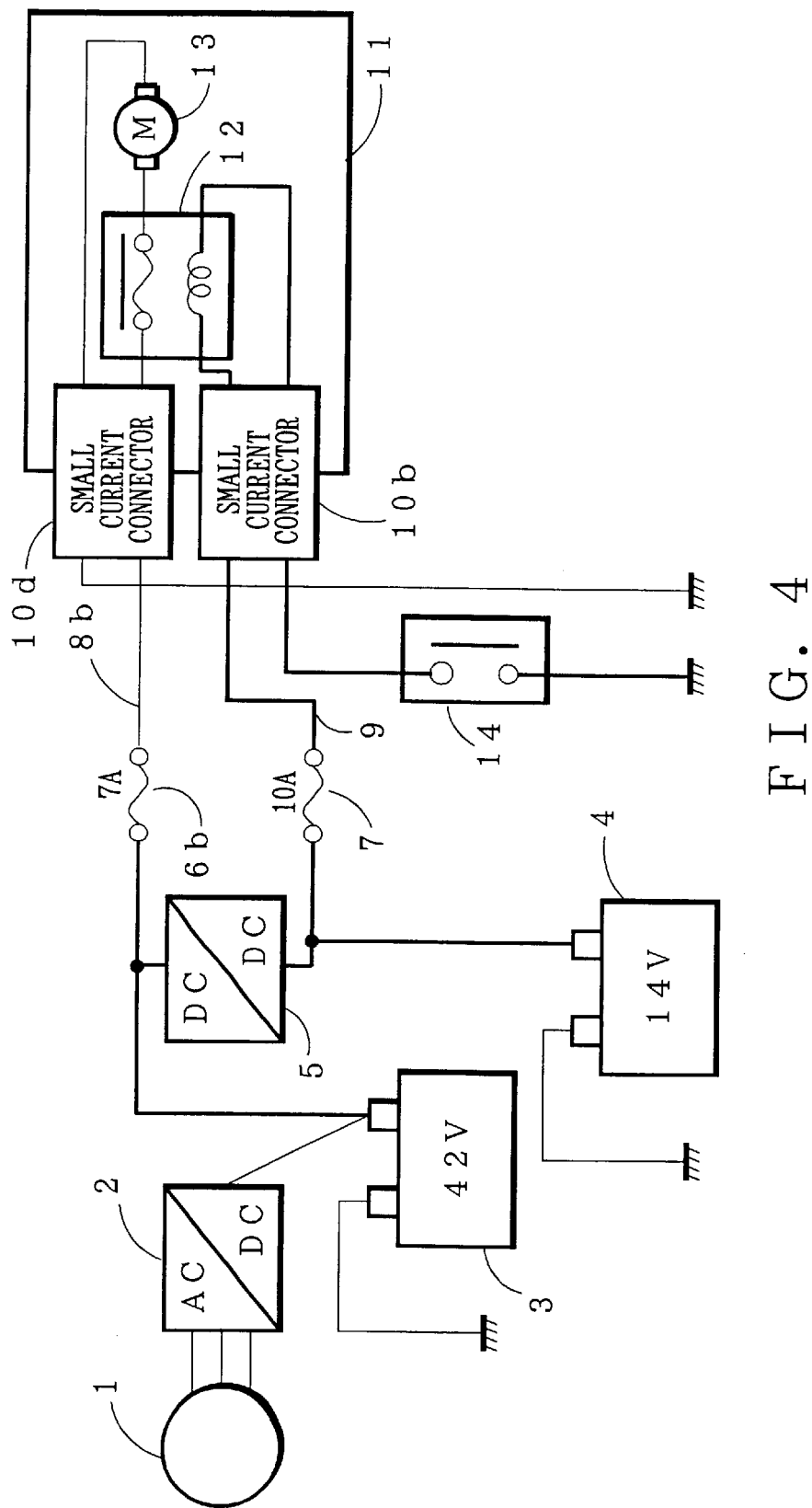
FIG. 4

ON-VEHICLE WIRING HARNESS AND WEIGHT REDUCTION METHOD OF THE SAME

BACKGROUND OF THE INVENTION

1. Field of the Invention

The present invention relates to an on-vehicle wiring harness, particularly to an on-vehicle wiring harness connecting a low voltage load and a high voltage load to batteries for supplying powers to the loads.

2. Related Art

A conventional wiring harness is used, for example as illustrated in FIG. 3A, in an on-vehicle electrical wiring system.

In FIG. 3A, an alternator 1 driven by an engine (not shown) generates an alternating current which is converted into a direct current at an effective voltage of 14 volts by an AC/DC converter 20. The direct current is supplied to a 14-volt battery 4 through a power supply line for charging a power.

Meanwhile, the 14-volt battery 4 supplies the direct current having the 14 volt effective voltage to a large current connector 10a through a 20-ampere fuse 6a and a large current electrical cable 8a. The direct current is input to a small current connector 10b through a 10-ampere fuse 7 and a small current electrical cable 9. Note that the fuses 6a and 7 are determined each based on an allowable current value of the rated electrical cable 8a or 9.

The large current connector 10a and the small current connector 10b are arranged for inputting a power, for example, to an actuator 11a moving a wiper. The small current connector 10b outputs a small current for opening and closing a relay 12a in response to the push of a switch 14. The push of the switch 14 provides a small current to a coil of the relay 12a to bring the relay 12a in a closed state. Meanwhile, the large current connector 10a outputs a large current for driving a motor 13a of the actuator 11a. The large current is supplied to the motor 13a, when the relay 12a is brought in its closed state in response to the push of the switch 14. The relay 12a and the motor 13a each are driven by a pre-determined rated power having a rated 14 volt voltage.

The large current electrical cable 8a has a minimum diameter but allows a large current determined by the rated power consumption of the motor 13a and the applied effective voltage of 14 volts. The cable 8 has, for example, a sectional area of 1.25 mm$^2$. The fuse 6a allows a large current of 20 amperes.

Meanwhile, the small current electrical cable 9 has a minimum diameter and allows a small current determined by the rated power consumption of the relay 12a and the applied effective voltage of 14 volts. The cable 9 has, for example, a sectional area of 0.5 mm$^2$. The fuse 6a allows the small current of 10 amperes.

However, the actuator 11a requires two lines each having the large current connector 10a or the small current connector 10b. The connectors 10a and 10b each have a metal pin terminal different according to each electrical cable diameter allowing each current. This increases the number of parts, causing an increased manufacturing cost.

To reduce the number of parts of the components illustrated in FIG. 3B, it may be proposed that the pin terminals of the two lines are unified to correspond to the large current electrical cable 9 having a sectional area of 1.25 mm$^2$.

In FIG. 3B, an actuator 11b has a large current connector 10c which is also used for a small current. Reference numerals 12a and 13a designate the same components described in FIG. 3A.

However, the large current connector 10c should have a configuration corresponding to a large current not only of the pin terminal but also as a whole. Generally, the pin terminal requires a larger size as corresponding to a large current specification thereof. Thus, the unified specification for the large current results in a larger size of the connector. This is undesirable for a weight reduction requirement of cars having a lots of connectors. Furthermore, the unified large current terminals increases their material cost.

Recently, some of on-vehicle appliances use a high voltage battery 30 having a 48 volt voltage for an effective operation thereof. This reduces electrical cables in diameter and allows smaller connectors. However, there are still the following problems.

FIG. 4 is a block diagram of an on-vehicle electrical wiring system using a 48 volt battery. In FIG. 4, reference numerals the same as those of FIG. 3A each designate the same component as that of FIG. 3A, which will not be discussed again.

In FIG. 4, an alternating generated by the alternator 1 is converted into a direct current at a 42 volt effective voltage by the AC/DC converter 2. The direct current is supplied to a 42-volt battery 3 to be charged therein through a power supply line. The DC 42 volt power is partially converted into a direct current at a 14 volt effective voltage by a DC/DC converter 5 to be supplied to a 14-volt battery 4.

The direct current at the 14 volt effective voltage is delivered from the 14-volt battery 4 to the small current connector 10b through a 10-ampere fuse 7 and a small current electrical cable 9 in the same way as illustrated in FIG. 3A. The direct current at the 42 volt effective voltage is delivered from the 42-volt battery 3 to a small current connector 10d through a 7-ampere fuse 6b and a small current electrical cable 8b. The ratings of the fuses 6b and 7 are determined based on allowable current values of the electrical cables 8b and 9.

The small current connectors 10b and 10d are arranged for delivering a power to an actuator 11 in the same way as discussed of FIG. 3A. The actuator 11 has a motor 13 driven by a 42 volt voltage, but the motor 13 has the same rated power consumption as the motor 13a of FIG. 3A.

In the same way as discussed of FIG. 3A, the push of the switch 14 brings a relay 12 in a closed state so that the motor 13 receives a power to be brought into operation.

The small current electrical cable 9 allows a predetermined small current and has a minimum diameter, for example, with a sectional area of 0.5 mm$^2$ as well as that of FIG. 3A. However, since the motor 13 having a 42 volt rating has the same rated power consumption as the motor 13a, the allowable current value of the small current electrical cable 8b is one-third of that of the small current electrical cable 8b of FIG. 3A. Theoretically, in view of weight reduction, the large current electrical cable 8a may have a sectional area of one-third of 1.25 mm$^2$. The associated connector 10d also can have a reduced size.

This arrangement is advantageous for a weight reduction of a car but brings about the following disadvantage. That is, an electrical cable having an extremely small diameter to reduce its weight causes a difficult assembling work, for example, in soldering thereof. This requires a specified jig. Furthermore, the electrical cables 8b and 9 are different from each other in diameter and require connectors 10d and 10b which are different from each other in shape. This results in an increased time for assembling the cables and connectors, causing an increased manufacturing cost.

SUMMARY OF THE INVENTION

In view of the aforementioned disadvantages, an object of the present invention is to provide an on-vehicle wiring harness assembly having cables unified in size for different uses. The wiring harness assembly can reduce a manufacturing cost thereof and also can consist of cables having an appropriately minimized diameter to achieve a weight reduction of the wiring harness assembly.

Referring to FIG. 1, the present invention will be discussed.

For achieving the object, in a first aspect of an on-vehicle wiring harness according to the present invention, an on-vehicle wiring harness has a first electrical cable 90 having a minimum diameter and a second electrical cable 80. The first electrical cable connects a low voltage load 120 to a low voltage battery 40 for supplying a power. The first electrical cable 90 has a first current rating corresponding to a rated power consumption of the low voltage load 120. The second electrical cable 80 connects a high voltage load 130 to a high voltage battery for supplying a power. The second electrical 80 cable has a second current rating corresponding to a rated power consumption of the high voltage load 130. The second current rating is smaller than the first current rating, and the second electrical 80 cable has the same diameter as that of the first electrical cable 90.

In the first aspect of the present invention, the first electrical cable 90 has a diameter based on the rated power consumption of the low voltage load 120 for allowing the first current rating, while the second electrical cable 80 has a diameter based on the rated power consumption of the high voltage load 130 for allowing the second current rating. The diameter of the first electrical cable 90 is equal to that of the second electrical cable 80 to unify the cables. However, the second current rating is smaller than the first current rating.

The unified electrical cables can reduce the number of parts as compared with electrical cables having two different diameters. The unification allows a simplified assembling work of the cables, reducing an assembling time thereof. These advantages result in a reduced manufacturing cost.

Particularly, the electrical cables are unified to the first electrical cables 90 corresponding to the low voltage battery 40. Advantageously, this configuration can use widely available electrical cables together with the popular low voltage battery 40. Thus, such conventional reliable electrical cables are applied to the high voltage battery 30, eliminating the provision of new high voltage electrical cables. Furthermore, the associated connectors also may be conventional ones, reducing a producing cost thereof.

In a second aspect of the present invention, the wiring harness further includes a connector having a connection portion defined to correspond with the diameter of the first electrical cable 90. The connector electrically connects the first electrical cable 90 to the low voltage load 120, and the connector electrically connects the second electrical cable 90 to the high voltage load 130. Thus, the connection portion can have unified components, for example, unified pin terminals, thereby allowing a simplified construction of the connection portion.

The connectors are unified in size so as to correspond to the diameter of the first electrical cable 90. This allows a compact connector in place of the large current connector 10c illustrated in FIG. 3B. The unification and size reduction enable a reduced number of parts, a weight reduction, and a reduced manufacturing cost.

In a third aspect of the present invention, the low voltage battery 40 has an effective voltage of 14 volts, and the high voltage battery 30 has an effective voltage of 42 volts.

In the third aspect of the invention, the low and high voltage batteries 40, 30 having the effective voltage of 14 volts or 42 volts are commercially available, resulting in a decreased manufacturing cost of the batteries.

A fourth aspect of the present invention is an weight reduction method of an on-vehicle wiring harness. The wiring harness includes a first electrical cable 90 having a minimum diameter and a second electrical cable 80 having a minimum diameter. The first electrical cable 90 connects a first on-vehicle unit to a low voltage battery 40 for supplying a power. The first electrical cable 90 has a first current rating corresponding to a first rated power consumption of the first on-vehicle unit. The second electrical cable 80 connects a second on-vehicle unit to a high voltage battery 30 for supplying a power. The second electrical cable 80 has a second current rating corresponding to a second rated power consumption of the second on-vehicle unit. The high voltage battery 30 for the second on-vehicle unit is determined such that the second current rating is smaller than the first current rating, and the second electrical cable 80 has a diameter equal to that of the first electrical cable 90.

In the fourth aspect of the invention, the battery 30 supplying a power to the second on-vehicle unit has a high voltage. The second on-vehicle unit is designed to have the second rated power consumption such that the second current rating is smaller than the first current rating. Furthermore, the second electrical cable 80 is selected to have the same diameter as the first electrical cable 90. That is, the wiring harness is constituted to have a plurality of unified cables each the same as the first electrical cable 90.

The provision of the high voltage battery reduces a rated current of the second on-vehicle unit. This allows a reduced diameter of the second electrical cable 80. Thereby, a weight reduction of the electrical cables is achieved as a whole. The second electrical cable 80 is unified to the first electrical cable 90 to have the same diameter. The unified electrical cables can reduce the number of parts as compared with electrical cables having two different diameters. The unification allows an easy inventory control of the parts, enabling a reduced producing cost.

The second on-vehicle unit is selected to have the second rated power consumption of the second current rating smaller than the first the current rating. Thus, the electrical cables are unified to the first electrical cables 90 corresponding to the low voltage battery 40.

Advantageously, this configuration can use widely available electrical cables together with the popular low voltage battery 40. Thus, such conventional reliable electrical cables are applied to the high voltage battery 30, eliminating the provision of new high voltage electrical cables. Furthermore, the associated connectors also may be conventional ones, reducing a producing cost thereof.

Furthermore, in this configuration, the second electrical cable 80 could have a diameter excessively smaller than that of the first electrical cable 90 for the weight reduction of the cable. However, the excessive small diameter of the second electrical cable 80 causes a difficult assembling work for soldering the cable to a pin terminal of a connector. For the assembling work, a special jig will be required. In the mean time, the present invention applies cables appropriately small in diameter to eliminate an increased assembling work and an increased manufacturing cost.

Thus, in the present invention, the unification of the cables advantageously reduces the number of parts, and the appropriately small diameter of the electrical cable allows as a whole a weight reduction of the on-vehicle electrical cables.

BRIEF DESCRIPTION OF THE DRAWINGS

FIG. 1 is a block diagram showing a basic configuration of the present invention;

FIG. 2 is a block diagram showing an on-vehicle electrical wiring system including an embodiment of the present invention;

FIGS. 3A and 3B each are a block diagram showing an on-vehicle conventional electrical wiring system including a wiring harness and a conventional connector; and FIG. 4 is a block diagram showing an on-vehicle electrical wiring system provided with a 42-volt battery related to the present invention.

DETAILED DESCRIPTION OF THE PREFERRED EMBODIMENT

Referring to the accompanied drawings, an embodiment of the present invention will be discussed.

FIG. 2 is a block diagram showing an on-vehicle electrical wiring system including an embodiment of an on-vehicle wiring harness and an on-vehicle wiring harness reduced in weight according to the present invention. In FIG. 2, an alternating current generated by an alternator 1 is converted into a direct current of an effective voltage of 42 volts by an AC/DC converter 2. The direct current is supplied through a power supply line to a 42-volt battery 3 for electrical charge and is partially converted into a direct current of an effective voltage of 14 volts by a DC/DC converter 5 to be supplied to a 14-volt battery 4.

The 42-volt battery 3 supplies a direct current of the 42 volt effective voltage to a small current connector 10 through a 10-ampere fuse 6 and a small current electrical cable 8. Meanwhile, the 14-volt battery 4 supplies a direct current of the 14 volt effective voltage to the small current connector 10 through a 10-ampere fuse 7 and a small current electrical cable 9.

The 42-volt battery 3 and the 14-volt battery 4 are commercially available, so that the batteries are easily prepared, resulting in a reduced manufacturing cost thereof.

The small current connector 10 is arranged, for example, to supply a power to an actuator 11 for moving a wiper. The connector 10 outputs an electrical current supplied from the 14-volt battery 4 in the same way as described of FIG. 4 to open and close a relay 12 in response to the push of a switch 14. The push of the switch 14 supplies an electrical current to a coil of the relay 12 to close the relay 12. The closed relay 12 supplies an electrical current from the 42-volt battery 4 to a motor 13 through the connector 10 to operate the motor 13.

The relay 12 is designed to be operated by a 14 volt voltage, and the motor 13 is designed to be operated by a 42 volt voltage. They require the same rated power consumption as discussed of FIG. 3A and FIG. 4.

The small current electrical cable 9 electrically connecting the 14-volt battery 4 to the relay 12 allows the current rating of the relay 12 in the same way as described of FIG. 3. The current rating is calculated from the rated power consumption and the rated voltage (14 volts). The cable has a minimum diameter, for example, of a 0.5 mm² sectional area, and the same type cable is used to the small current electrical cable 8 connecting the 42-volt battery 3 to the 42 volt rated motor 1. Since the rated power consumption of the 42 volt rated motor 13 is equal to that of the conventional 14 volt type motor 13a illustrated in FIG. 3A, the 42 volt rated motor 13 has a lower current rating. Thus, the electrical cable 8 may have a diameter having a sectional area less than 0.5 mm² for a maximum weight reduction of the cable. However, the electrical cable 8 is intentionally selected to be equal to the 14 volt rated electrical cable 9.

Advantageously, this configuration can use widely available electrical cables incorporated with a popular 14-volt battery 4. Thus, such conventional reliable electrical cables are applied to the high voltage battery 30, eliminating the provision of new specified 42-volt electrical cables. Furthermore, the associated connectors also may be conventional ones of a 14 volt rating.

The connector 10 may have one type of pin terminal having a 0.5 mm² sectional area, since the electrical cables 8 and 9 are unified. A connector housing associated with the connector 10 may be one type corresponding to the pin terminal.

Furthermore, the embodiment intends that the electrical cable 8 does not have a diameter excessively smaller than the electrical cable 9 for weight reduction of the cable. The excessive small diameter of the electrical cable 8 might cause a difficult assembling work for soldering the cable onto a pin terminal of a connector. For the assembling work, a special jig will be required. In the mean time, the present invention can eliminate an increased assembling work and an increased manufacturing cost.

The unified electrical cables can reduce the number of parts as compared with electrical cables having two different diameters. The unification allows a simplified assembling work of the cables, reducing an assembling time thereof. The number of jigs for the assembling also is decreased. An easy inventory control of the parts will be expected. These advantages result in a considerably reduced manufacturing cost.

Thus, in the embodiment, the unification of the cables advantageously reduces the number of parts, and an appropriately small diameter of the electrical cable allows as a whole a weight reduction of the on-vehicle electrical cables.

The configuration of the embodiment also corresponds to the fourth aspect of the invention. For weight reduction of an on-vehicle wiring harness which is illustrated in FIG. 3A, the battery (battery 3) supplying a power to the second on-vehicle unit (motor 13) has a high voltage (42 volts). The second on-vehicle unit is designed to have the second rated power consumption such that the second the current rating is smaller than the first current rating. Furthermore, the second electrical cable (cable 8) is selected to have the same diameter as the first electrical cable (cable 9). That is, the on-vehicle wiring harness is constituted to have a plurality of unified cables each the same as the first electrical cable.

The ratings of the fuses 6 and 7 are determined to meet the electrical cable 9 carrying the large current with the unification of the electrical cables 8 and 9. Thereby, the number of parts further decreases.

Next, the relationship between the constitutional components of the first to third aspects of the present invention and those of the embodiment will be discussed. The 42-volt battery 3 corresponds to the high voltage battery 30; the 14-volt battery 4 corresponds to the low voltage battery 40; the first electrical cable 90 corresponds to the small current electrical cable 9; the second electrical cable 80 corresponds to the small current electrical cable 8; and a connector 100 corresponds to the connector 10 for supplying a power.

The 42-volt battery 3 operates other electrical appliances including an igniter, a heating wire for a defroster, and a window moving motor. The present invention can be applied to the electrical appliances in the same way as the motor 13. The 14-volt battery 4 operates electrical appliances such as a head lamp, a tail lamp, a room lamp, a horn, indication meters, and accessories. The present invention can be applied to these appliances in the same way as the relay 12.

What is claimed is:

1. An on-vehicle wiring harness comprising:

a first electrical cable having a minimum diameter, the first electrical cable connecting a low voltage load to a low voltage battery for supplying a power, the first electrical cable having a first current rating corresponding to a rated power consumption of the low voltage load, and a second electrical cable for connecting a high voltage load to a high voltage battery for supplying a power, the second electrical cable having a second current rating corresponding to a rated power consumption of the high voltage load, wherein the second current rating is smaller than the first current rating, and the second electrical cable has the same diameter as that of the first electrical cable.

2. The wiring harness set forth in claim 1 further comprising a connector having a connection portion defined to correspond with the unified diameter of the first and second electrical cables, wherein the connector electrically connects the first electrical cable to the low voltage load, and the connector electrically connects the second electrical cable to the high voltage load.

3. The wiring harness set forth in claim 1 wherein the low voltage battery has an effective voltage of 14 Volts, and the high voltage battery has an effective voltage of 42 volts.

4. A weight reduction method of an on-vehicle wiring harness which includes a first electrical cable having a minimum diameter, the first electrical cable connecting a first on-vehicle unit to a low voltage battery for supplying a power, the first electrical cable having a first current rating corresponding to a first rated power consumption of the first on-vehicle unit, and a second electrical cable having a minimum diameter, the second electrical cable connecting a second on-vehicle unit to a high voltage battery for supplying a power, the second electrical cable having a second current rating corresponding to a second rated power consumption of the second on-vehicle unit, wherein the high voltage battery for the second on-vehicle unit is determined such that the second current rating is smaller than the first current rating, and the second electrical cable is determined to have a diameter equal to that of the first electrical cable.

* * * * *